(12) United States Patent
Joudon et al.

(10) Patent No.: US 11,959,400 B2
(45) Date of Patent: Apr. 16, 2024

(54) FAN ROTOR WITH VARIABLE PITCH BLADES AND TURBOMACHINE EQUIPPED WITH SUCH A ROTOR

(71) Applicant: Safran Aircraft Engines, Paris (FR)

(72) Inventors: Vincent Joudon, Moissy-Cramayel (FR); Régis Eugène Henri Servant, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 104 days.

(21) Appl. No.: 17/802,830

(22) PCT Filed: Feb. 26, 2021

(86) PCT No.: PCT/EP2021/054791
§ 371 (c)(1),
(2) Date: Aug. 26, 2022

(87) PCT Pub. No.: WO2021/170780
PCT Pub. Date: Sep. 2, 2021

(65) Prior Publication Data
US 2023/0141180 A1  May 11, 2023

(30) Foreign Application Priority Data
Feb. 27, 2020  (FR) ...................... 2001928

(51) Int. Cl.
*F01D 7/00* (2006.01)
*F01D 5/30* (2006.01)
*F01D 5/32* (2006.01)
(52) U.S. Cl.
CPC ............. *F01D 7/00* (2013.01); *F01D 5/3007* (2013.01); *F01D 5/3092* (2013.01); *F01D 5/32* (2013.01); *F05D 2260/74* (2013.01)

(58) Field of Classification Search
CPC ........ F01D 7/00; F01D 5/3007; F01D 5/3092; F01D 5/32; F05D 2260/74; F04D 29/323;
(Continued)

(56) References Cited

U.S. PATENT DOCUMENTS 4,453,891 A * 6/1984 Forestier .................. F01D 5/26
416/500
2006/0165530 A1  7/2006 Corbin et al.
(Continued)

FOREIGN PATENT DOCUMENTS

EP    1 209 322 A2    5/2002
EP    1 209 322 A3    2/2004
(Continued)

OTHER PUBLICATIONS

International Search Report (PCT/ISA/210) issued in PCT/EP2021/054791, dated May 6, 2021.

*Primary Examiner* — Juan G Flores
*Assistant Examiner* — Eric A Lange
(74) *Attorney, Agent, or Firm* — BIRCH, STEWART, KOLASCH & BIRCH, LLP

(57) ABSTRACT

The present invention relates to a fan rotor with variable pitch blades, comprising a rotor disc, equipped at its periphery with a plurality of rotary fasteners (16), each fastener (16) comprising a cell (17) for receiving the root (150) of a blade (15). This rotor is characterised in that an elongated wedge (2) and a prestressing rod (3) with at least one cam (33) are also arranged in each cell (17), the bottom of the cell (17) comprising as many retraction cavities (173) as the rod (3) comprises cams (33), in that the prestressing rod (3) is interposed between the wedge (2) and the bottom (171) of the cell (17), so that said cam (33) is facing a corresponding retraction cavity (173) and in that the prestressing rod (3) can rotate about its longitudinal axis (X2-X'2), between a rest position, in which the cam (33) is housed in the
(Continued)

retraction cavity (173), and an armed position, in which the cam (33) exerts a radial pressure on the central region (22) of the wedge (2) so as to move the wedge (2) towards the blade root (150).

16 Claims, 12 Drawing Sheets

(58) Field of Classification Search
CPC ... B64D 2027/005; B64D 27/00; B64C 11/06; B64C 11/32; Y02E 10/72; Y02T 50/60
See application file for complete search history.

(56) References Cited

U.S. PATENT DOCUMENTS

| | | |
|---|---|---|
| 2009/0004017 A1 | 1/2009 | Belmonte et al. |
| 2011/0206530 A1 | 8/2011 | Fabre |
| 2014/0178202 A1 | 6/2014 | Chatenet et al. |
| 2016/0121999 A1 | 5/2016 | Tajan et al. |

FOREIGN PATENT DOCUMENTS

| | | | |
|---|---|---|---|
| EP | 3 010 799 A1 | 4/2016 | |
| FR | 2 881 174 A1 | 7/2006 | |
| FR | 2 918 129 A1 | 1/2009 | |
| FR | 2 934 873 A1 | 2/2010 | |
| FR | 3 005 683 A1 | 11/2014 | |
| FR | 3005683 A1 * | 11/2014 | ............ B64C 11/04 |
| FR | 3 017 163 A1 | 8/2015 | |
| WO | WO 2012/156633 A1 | 11/2012 | |

\* cited by examiner

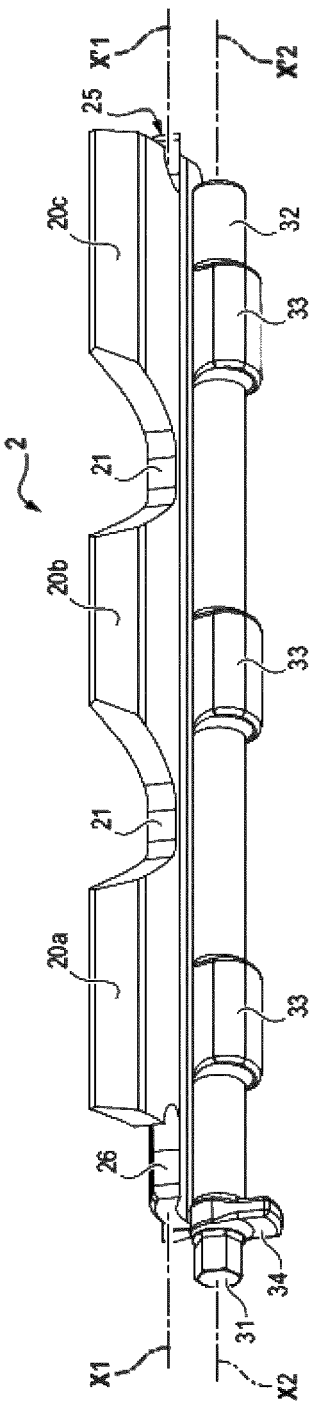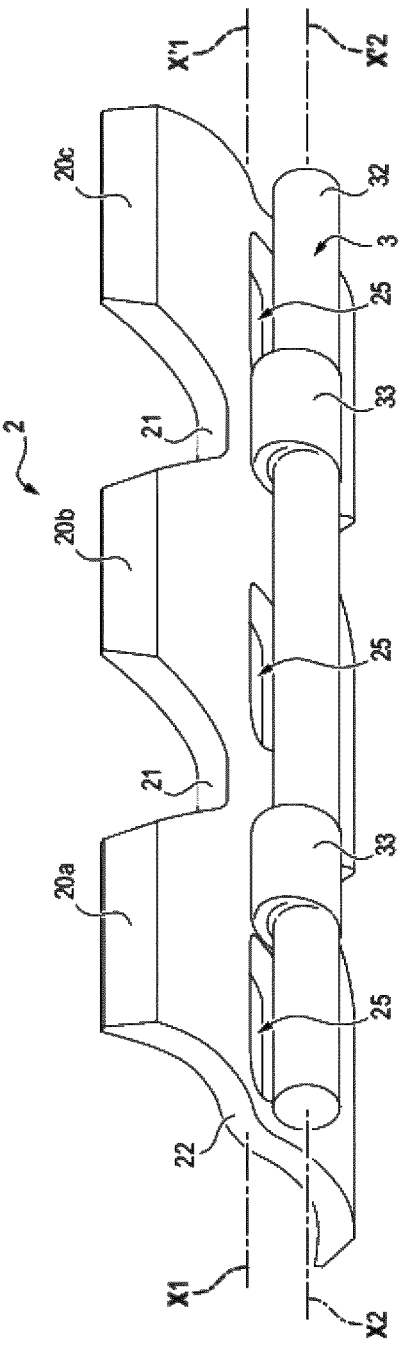

[Fig. 11]
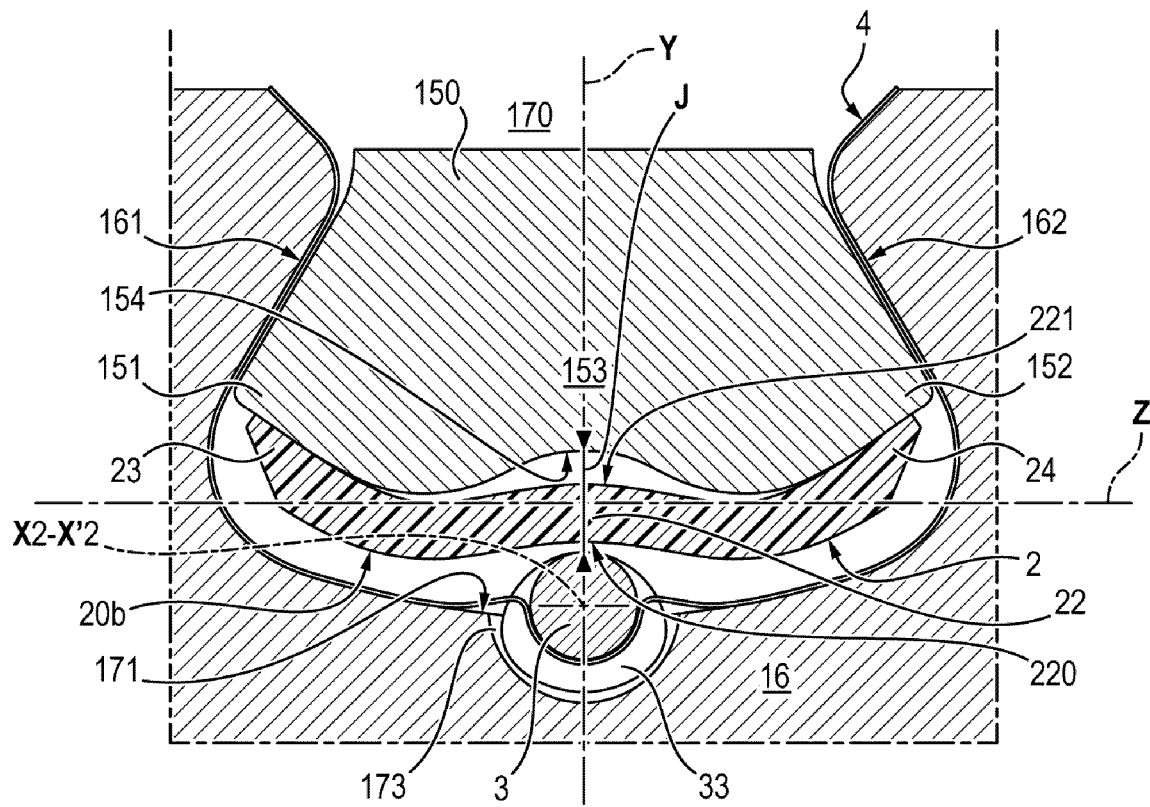
[Fig. 12]
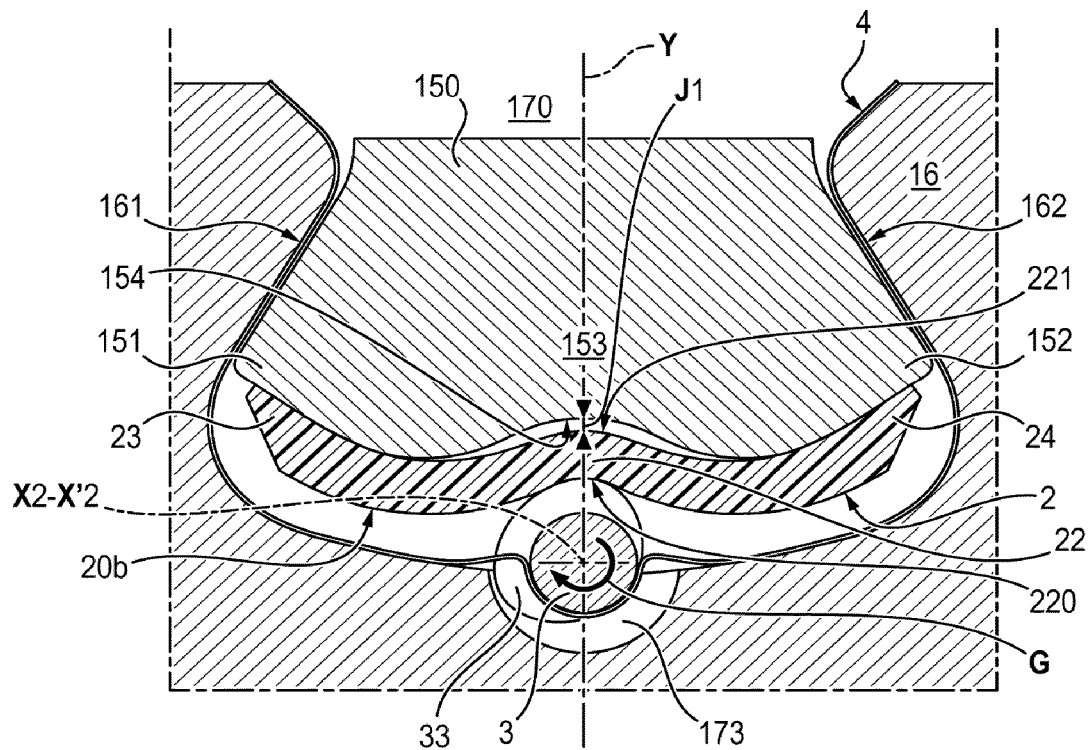

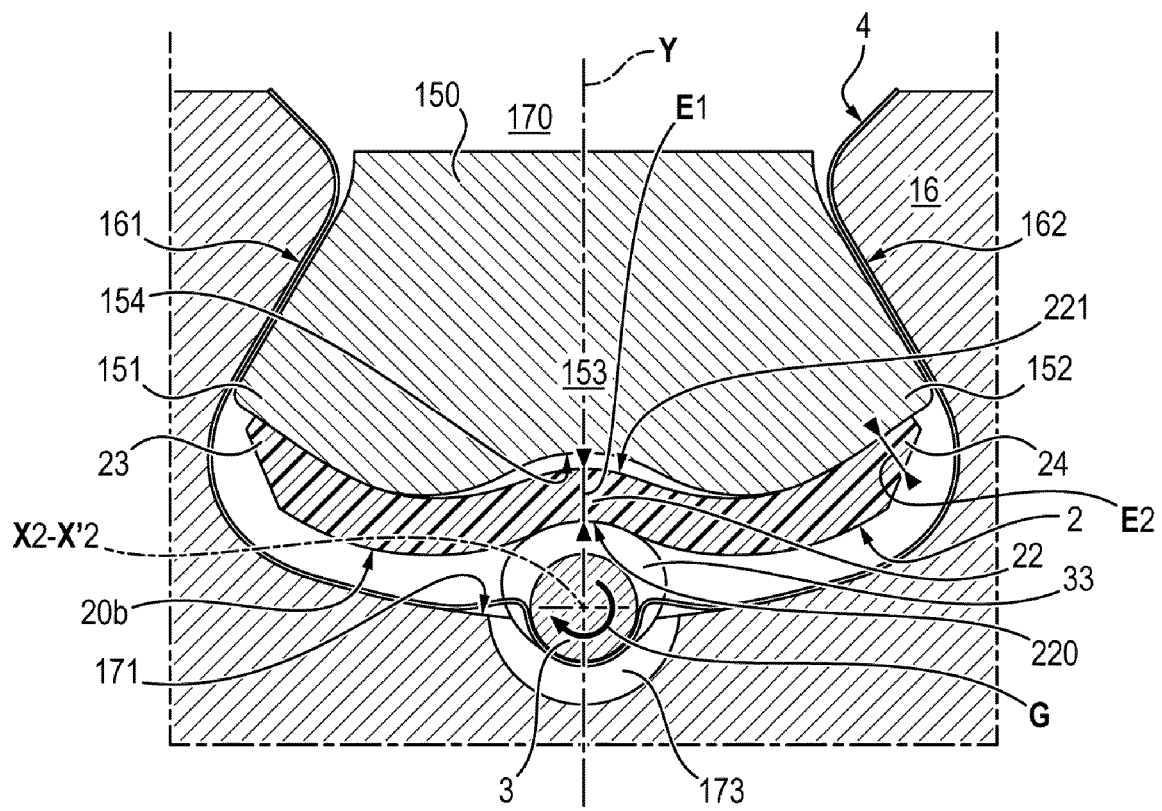
[Fig. 13]

FAN ROTOR WITH VARIABLE PITCH BLADES AND TURBOMACHINE EQUIPPED WITH SUCH A ROTOR

FIELD OF THE INVENTION

The invention lies in the field of fan, ducted (fan) or unducted (propeller), rotors equipped with variable pitch blades.

The potential applications are the aeronautical propulsion industry, for example turboprops, variable pitch fans (VPF), unducted fans (unducted single fans or USF), or unducted rotors with two contra-rotating propellers (contra-rotating open rotor or CROR) but also the renewable energy industry (wind turbines).

The invention also relates to a turbomachine equipped with a fan rotor having variable pitch blades.

PRIOR ART

Already known from document FR 2 918 129 is a fan rotor comprising a rotor disc provided at its periphery with cells each intended to receive a blade root, with fixed pitch. This rotor comprises a wedge of 3D-woven composite, interposed between the blade root, also made of 3D-woven composite, and the bottom of the metal cell. During the forced mounting of the wedge, it is elastically deformed due to its longitudinal curvature and exerts a pressure below the blade root, which has the effect of pressing the blade root on the bearing surfaces of the cell.

The two roles of the wedge are to ensure the proper positioning of the blade in the disc and to damp the impact of the blade root on the bottom of the cell during a provoked shock, due for example to bird ingestion into the rotor.

Also known in the prior art is a fan rotor provided with variable pitch blades. Documents EP 3 010 799 or FR 3 017 163 describe for example a pivot comprising a blade support, provided with a housing intended to receive a blade root, this blade support being secured to a rotating support mounted radially on a propeller hub while being able to pivot around a radial axis of the rotor.

Document WO2012/156633 describes a fan rotor the blades of which do not have variable pitch and which consequently does not comprise fasteners mounted in rotation around a pitch axis. This document simply describes the use of a wedge of elastically deformable material, inserted into a cell for receiving a blade root.

Document FR 2 934 873 describe a fan rotor provided with cells for receiving a blade root in the form of a dovetail. A wedge is inserted between the blade root and the bottom of the cell.

Also known from document FR 2 881 174 is a fan rotor with fixed pitch blades in which the rotor disk is provided with a plurality of cells for receiving blade roots. A deformable wedge is inserted between the bottom of the cell and a blade root.

Document FR 3005683 describes a fan rotor with variable pitch blades, provided with a plurality of fasteners for receiving a blade root. The fastener comprises a groove for receiving the blade root and a wedge is inserted in the groove below the blade root.

None of these four documents describes or suggests the use of a prestressing rod.

The design of a fan blade involves several disciplines, the objects of which are generally antagonistic. It must allow obtaining optimal aerodynamic performance (i.e. supply thrust while maximizing efficiency) and guarantee the mechanical strength of the blade (i.e. withstand the mechanical stresses resulting from static and dynamic loads), while limiting the mass of the blade as well as its acoustic signature. In particular, the improvement of the aerodynamic performance of the fan tends toward an increase in the bypass ratio for a double flow engine, which translates into an increase in its outer diameter and therefore the span of its blades.

At the same time, in the previously mentioned architectures (VPF, USF, CROR and turboprop), the engine start is carried out with a very open pitch, called "feathered."

In the appended FIGS. 1 and 2, which show respectively conventional blade operation and feathered operation, the blade A, the engine axis X, the propeller plane P, the pitch angle C and the angle of attack I can be seen.

Power is proportional to the product of speed and torque. But torque increases with the angle of attack I, which can be increased via the pitch C. Starting feathered allows consuming power through torque, which ensures the safety of the machine by guaranteeing low fan speeds.

A person skilled in the art knows that the resulting force (arrow F) on a blade profile is, to a first approximation, perpendicular to the chord of the blade and can be broken down into two components: thrust along the engine axis X and blade drag in the plane P of the propeller. Thus, with the increase in the pitch of the blades, the resulting force moves toward the plane P, which has the effect of increasing the drag of the aerodynamic profile and reducing thrust.

In FIG. 2, the thrust generated by the fan is zero, the torque is a maximum and the speed a minimum.

However, the angle of attack I becomes so large that the blades A then undergo a strongly separated turbulent aerodynamic flow which generates a strong vibration excitation. In particular, in blades with a large chord and large span which generate substantial drag, this aerodynamic force F is intense, even though the speed is not high.

For a variable pitch blade, assembled with a pivot like that described for example in documents EP 3 010 799 or FR 3 017 163, this aerodynamic force is so intense that it can cause solid-body movement of the blade root in its cell which are similar to "rolling-up," see the rotations illustrated in the appended FIG. 3: roll i (rotation around the broaching axis of the blade), pitch ii (rotation around an axis perpendicular to the broaching axis and to the radial axis) and finally yaw iii (rotation around the radial axis).

In fact, when starting feathered, the reduced speed of the fan does not allow generating a sufficient centrifugal force to prevent these movements induced by the aerodynamic force. It follows that there is a risk of damage to the blade and to the wedge inserted between the blade root and the housing of the "wear by friction" type (fretting), and limitation of the lifetime of the blades of the fan.

For this reason, fastening by pivot, previously described, does not seem in this case to be a viable solution for variable pitch fan blades with a large chord and a large span.

DISCLOSURE OF THE INVENTION

The invention therefore has as its object to limit the rolling-up of the blade when starting the rotor feathered, and to avoid premature wear.

To this end, the invention relates to a fan rotor provided with variable pitch blades, this rotor comprising a rotor disc equipped at its periphery with a plurality of fasteners, each fastener being rotatably mounted relative to said rotor disc around a radial pitch axis and each fastener comprising a cell for receiving the root of one of said blades, an elongated wedge being arranged in each cell.

In conformity with the invention, the central portion of the blade root has a recess, said blade root being arranged in the cell so that its recess is oriented toward the bottom of the cell, a prestressing rod with at least one cam is also arranged in each cell, said wedge being made of an elastically deformable material, at least one longitudinal segment of this wedge has a transverse profile in the form of an arc the central region of which is curved so that it comprises a domed portion protruding in the direction of the concavity of said arc and a hollow in the direction of the convexity of the arc, said wedge is arranged in the cell so that is domed portion faces the recess of the blade root and its hollow is oriented toward the bottom of the cell, the bottom of said cell comprises as many retraction cavities as the rod has cams, said prestressing rod is interposed between the hollow of the central region of said wedge and the bottom of the cell so that said cam faces the corresponding retraction cavity and said prestressing rod is movable in rotation around its longitudinal axis so as to be able to be moved between a resting position, in which the cam is housed in the retraction cavity, and an armed position in which the cam exerts a radial pressure on the central region of the wedge so as to move said wedge in the direction of the blade root and so that the two lateral regions of said wedge, arranged on either side of the central region, are in contact with the lateral regions of the blade root and are remote from the bottom of the cell.

Due to the prestressing rod, it is possible, once this prestressing rod is in the armed position, to deform the wedge so that it then presses on the blade root while behaving like a spring. This allows compensating the loss of centrifugal force by the application of a large preload under the blade root.

Compared to a conventional broached fastener (without a prestressing rod), the invention allows limiting the premature wear of the blade during phases of starting when feathered.

Moreover, the system is advantageous in terms of mass, bulk and geometric tolerance.

According to other advantageous and non-limiting features of the invention, taken alone or in combination:
- there exists a function clearance between the recess of the blade root and the domed portion of the central region of the wedge located facing it, this clearance being greater in the resting position of the rod than when the rod is in the armed position;
- the bottom of the cell is provided with a longitudinal groove intended to receive and to guide the prestressing rod and said retraction cavities are provided in this groove;
- the wedge has a greater thickness in its central region that the thickness of its ends;
- said wedge consists of several sections connected by narrower junctions;
- a setting foil is arranged in the bottom of the cell of the fastener;
- one of the ends of the prestressing rod, preferably its upstream end, has a shape such as cut-aways which allows its gripping and its driving in rotation around its longitudinal axis by a tool;
- the prestressing rod has, in proximity to one of its ends, preferably its upstream end, a poka-yoke which extends radially relative to the longitudinal axis of said rod and which protrudes on the same side of the rod as the cams protrude;
- an upstream axial retention lock of the blade root, formed from a plate, is inserted into two upstream slots provided at the upstream end of the flanks of said cell for receiving the blade root, these two upstream slots being arranged in a V, and a rod lock is fastened to said upstream axial retention lock, this rod lock being provided with an opening for receiving one of the ends of the prestressing rod, preferably its upstream end, and a notch for receiving the poka-yoke of said rod, so as to block said prestressing rod in the armed position;
- a downstream axial retention lock of the blade root, formed from a plate, is inserted into two downstream slots provided at the downstream end of the flanks of said cell for receiving the blade root, these two downstream slots being arranged in a V, this downstream lock being drilled with an orifice for receiving the downstream end of said wedge and this downstream retention lock has on its inner face a surface forming an axial abutment for the downstream end of said stressing rod;
- said wedge is made of a 3D-woven composite material;
- the blades are made of 3D-woven composite material.

The invention also relates to a turbomachine equipped with a fan rotor with variable pitch blades as mentioned previously.

DESCRIPTION OF THE FIGURES

Other features, objects and advantages of the invention will be revealed by the description that follows, which is purely illustrative and not limiting, and which must be read with reference to the appended drawings in which:

FIG. 9 is a perspective view of the wedge in conformity with a first embodiment of the invention, and of the prestressing rod located in the resting position.

FIG. 10 is a perspective view of the wedge in conformity with a second embodiment of the invention, and of the prestressing rod located in the armed position.

FIG. 11 is a schematic view in transverse section of the prestressing rod, of the wedge and of the blade root, arranged inside a cell of a rotor disc fastener, the rod being in the resting position.

FIG. 12 is a schematic view in transverse section of the prestressing rod, of the wedge and of the blade root, arranged inside a cell of a rotor disc fastener, the rod being in an intermediate position between its resting position and its armed position.

FIG. 13 is a schematic section view of the prestressing rod, of the wedge and of the blade root, arranged inside a cell of a rotor disk fastener, the rod being in the armed position.

DETAILED DESCRIPTION OF THE INVENTION

Figure 1:
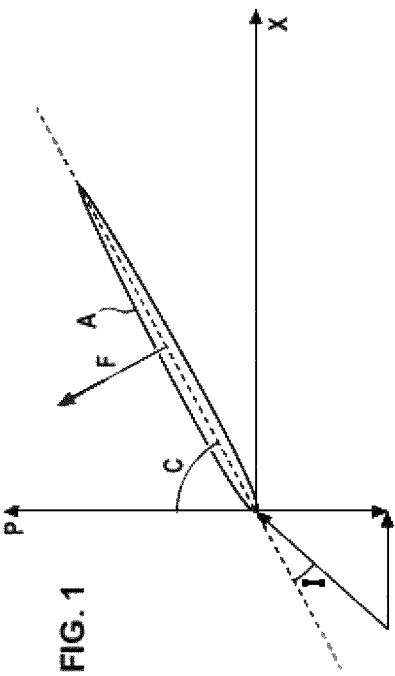
FIG. 1 is a schematic showing the operation of a blade in the conventional mode.
Figure 2:
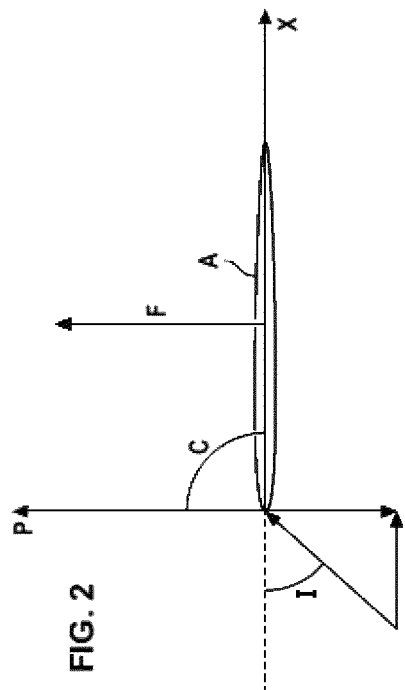
FIG. 2 is a schematic showing the operation of a blade in the feathered mode.
Figure 3:
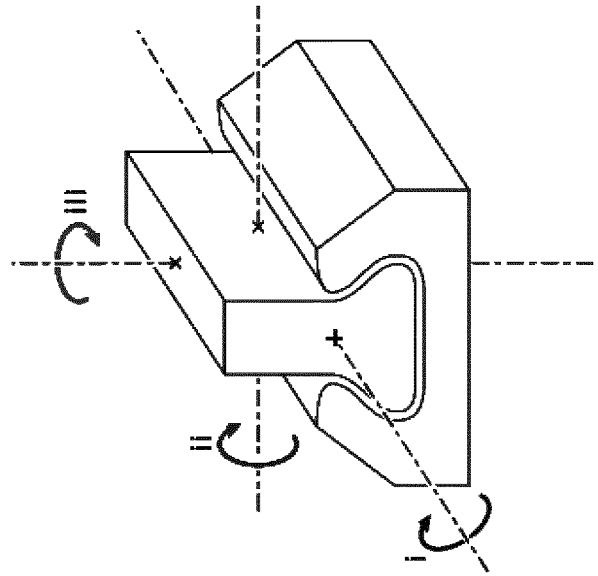
FIG. 3 is a schematic perspective view of the different rotations that a blade root of the prior art can undergo, housed in a rotor disc cell.
Figure 4A:
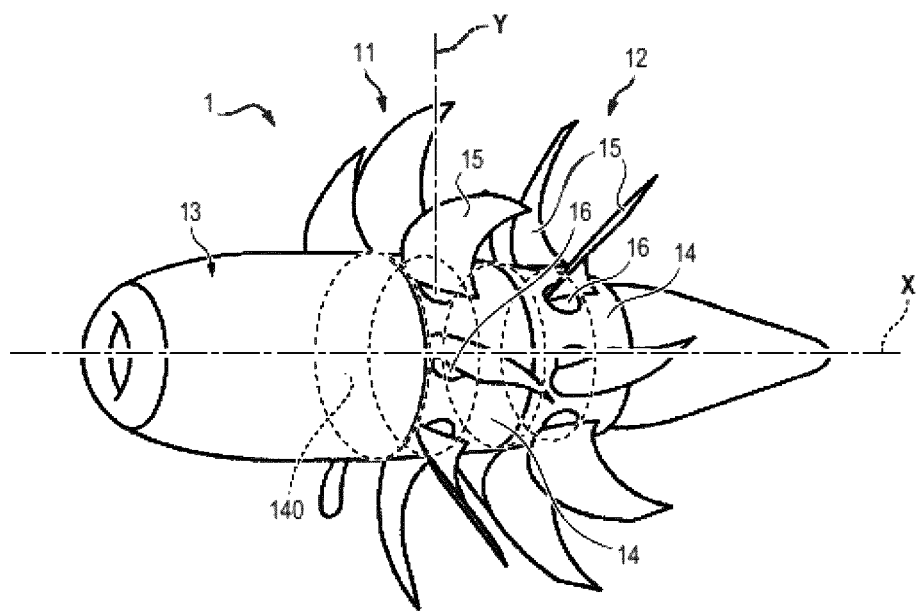
FIG. 4A is a schematic perspective view of an unducted fan equipped with two contra-rotating rotors in conformity with the invention.
Figure 4B:
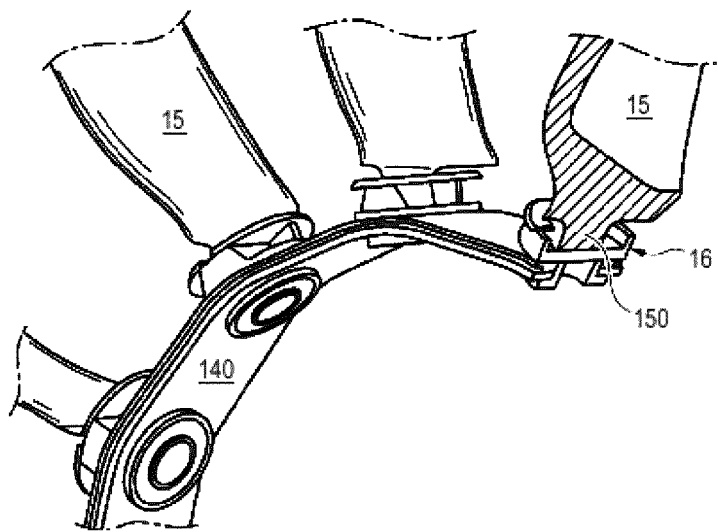
FIG. 4B is a perspective and partial section view of a portion of the rotor disk of the fan of FIG. 4A.

Referring to FIG. 4A, an example of an unducted fan 1 can be seen, comprising two fan rotors 11, 12 conforming to the invention. They are mounted on a nacelle 13, itself intended to be fastened to the fuselage of an airplane. Each rotor 11, 12 comprises a rotor disc 140 (or hub) to which is attached an outer casing 14 mounted in rotation relative to the nacelle 13, and a plurality of blades 15 attached to the disc. The disc 140 is shown in dotted lines in FIG. 4A because the outer casing 14 hides it, but it is more visible in FIG. 4B, in which the casing 14 is not shown.

In the present application, upstream and downstream are defined with respect to the normal direction of flow of gas in the rotor 11, 12. Moreover, its axis of rotation is called the axis X of the rotor. The "axial" direction corresponds to the direction of the axis X and a "radial" direction is a direction perpendicular to this axis and passing through it. Moreover, the "circumferential" direction corresponds to a direction perpendicular to the axis X and not passing through it. Unless the contrary is stated, inner and outer, respectively, are used with reference to a radial direction so that the inner portion or face of an element is closer to axis X than the outer portion or face of the same element.

Moreover, the rotor 11, 12 comprises a fastener 16 for each blade 15. Each fastener 16 is mounted in rotation relative to the rotor disc 140, around a radial pitch axis Y.

More precisely, the fastener 16 is mounted in rotation inside a housing provided in the rotor disc, by means of balls or other rolling elements. The fastener 16 is also known by the name of "pivot" in the literature. Document FR 2 943 312 can be referred to on the subject of this pivoting assembly.

Figure 5:
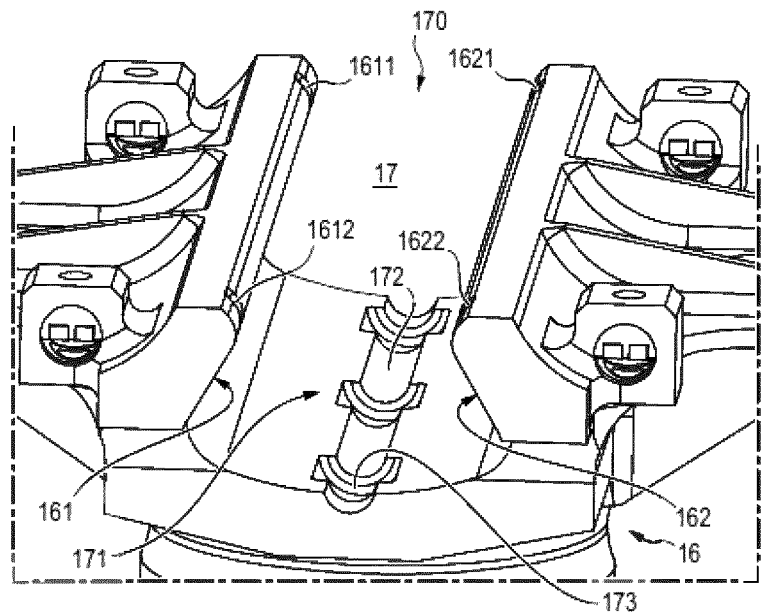
FIG. 5 is a perspective view of a cell for receiving the blade root.

As appears more clearly in FIG. 5, each fastener 16 comprises a cell 17 for receiving a blade 15 root 150, this root having for example the shape of a dovetail. It is more clearly visible in FIGS. 7 to 13 in particular.

The fastener 16 comprises two flanks 161 and 162, which define between them the upper radial opening 170 of the cell 17, opposite to the bottom 171 of the cell. The two flanks 161 and 162 are inclined toward one another and form bearing surfaces.

Each flank 161, 162 is provided with a downstream groove 1611, respectively 1621 and with an upstream groove 1612, respectively 1622. The two downstream grooves 1611, 1621, arranged at the downstream end of the cell 17 face one another and are arranged in a V. the same is true for the two upstream grooves 1612 and 1622 (see FIG. 5).

The cell 17 extends in an axial direction between an access on the side of the leading edge of the blade and an access on the side of the trailing edge of the blade. It is by one of these two opposite accesses that a blade root can be engaged in the cell 17, by sliding.

The invention will be better understood by describing explicitly in more detail the relation which exists between the different forces which act on a blade with a pivoting fastener. On the one hand, the centrifugal force exerted on the blade 15 is oriented in the radial direction and its value is proportional to the square of the speed of rotation of the rotor. This force therefore depends strongly on the engine speed. On the other hand, the centrifugal force presses the blade root 150 on the bearing surfaces 161, 162 of the cell 17, which ensure its retention. In other words, each bearing surface of the cell generates reaction force on the blade root 150 which is directed along the normal to the contact surface and the resultant of these forces opposes the centrifugal force. It is deduced that the value of the reaction forces at the bearing surfaces 161, 162 is directly linked to the centrifugal force. However, these reaction forces also play another very important role because they oppose the moment of the aerodynamic forces which cause the rolling-up of the blade 15. Consequently, in the case of starting when feathered, characterized by a reduced engine speed and a turbulent aerodynamic flow, the low centrifugal force induces reaction forces at the bearing surfaces 161, 162, which are insufficient to oppose the moment of the intense aerodynamic forces, which causes the rolling-up of the blade 15.

The invention consists of compensating the low centrifugal force by the application of a large preload under the blade root 150. To this end, a wedge 2 and a prestressing rod 3 with at least one cam are installed between the blade root 150 and the bottom 171 of the cell.

The wedge 2 will now be described by referring to FIGS. 9 to 13.

This wedge 2 has a generally elongated shape. It has a rectilinear profile along its longitudinal direction shown schematically by the axis X1-X'1 in FIGS. 9 and 10.

The wedge 2 consists of a single block of elastically deformable material. This material can for example be aluminum. However, advantageously, this material is a 3D (in three dimensions) woven composite material, for example of the "interlock weave" type. What is meant here by "interlock weave" is a 3D weave pattern in which each layer of warp yarns links several layers of weft yarns, with all the yarns of the same warp column having the same movement in the plane of the weave.

Also preferably, this material is anisotropic and its stiffness in the broaching direction, i.e. along the axis X1-X'1, is greater than the stiffness in the direction which transmits the forces of the cams to the blade root (circumferential direction Z—see FIG. 11).

The wedge 2 comprises at least one longitudinal section. In the exemplary embodiment shown in FIGS. 9 and 10, this wedge 2 comprises three longitudinal sections 20a, 20b, 20c (their number could be different), connected by narrower junctions 21 of the same material, the assembly forming a single part.

As appears more clearly in FIG. 11, each longitudinal section 20a, 20b, 20c has a transverse profile in the form of an arc of which the central region 22 is curved, so that it has a domed portion 221, protruding in the direction of the concavity of said arc and it has a hollow 220 in the direction of the concavity of the arc. The two lateral regions 23, 24 of the wedge are arranged at the two ends of the arc.

The wedge 2 is arranged in each cell 17 so as to be interposed between the blade root 150 and the prestressing rod 3, and so that its two lateral regions 23, 24 are in contact with the corresponding lateral regions 151, 152 of the blade root 150, while being remote from the bottom 171 of the cell 17 and its central region 22 is facing the central region 153 of said blade root 150.

The wedge 2 has a downstream end 25 and an upstream end 26 (see FIG. 9).

The prestressing rod 3 with at least one cam will now be descried by referring to FIGS. 7 to 11.

The rod 3 is cylindrical and has two ends, respectively upstream 31 and downstream 32.

It has a longitudinal axis X2-X'2. It comprises at least one cam 33, preferably formed in a single piece with the rest of the rod. This cam 33 protrudes over a portion of the circumference of the rod. The rod 3 can comprise more than one cam 33, two for example (see FIG. 10) or three (see FIGS. 7 to 9), distributed over its length, or even more than three.

Preferably, the prestressing rod 3 is made of steel or of a titanium alloy.

Advantageously, the bottom 171 of the cell is prepared and has a longitudinal groove 172, (preferably machined, see FIG. 5) to receive the rod 3. This groove 172 has as many retraction cavities 173 as the rod 3 has cams 33, each retraction cavity 173 being intended to receive a cam 33.

This groove 172 is intended to guide and to support the rod 3 in its regions with no cam. It plays the role of a lower half-bearing when the rod 3 is in the groove.

Once placed in the groove, the rod 3 can be manipulated in rotation so as to make it pivot around its longitudinal axis X2-X'2, by means of a tool. To this end, one of its ends, preferably its upstream end 31, advantageously has cutaways facilitating its gripping (see FIG. 9).

Figures 17, 18:
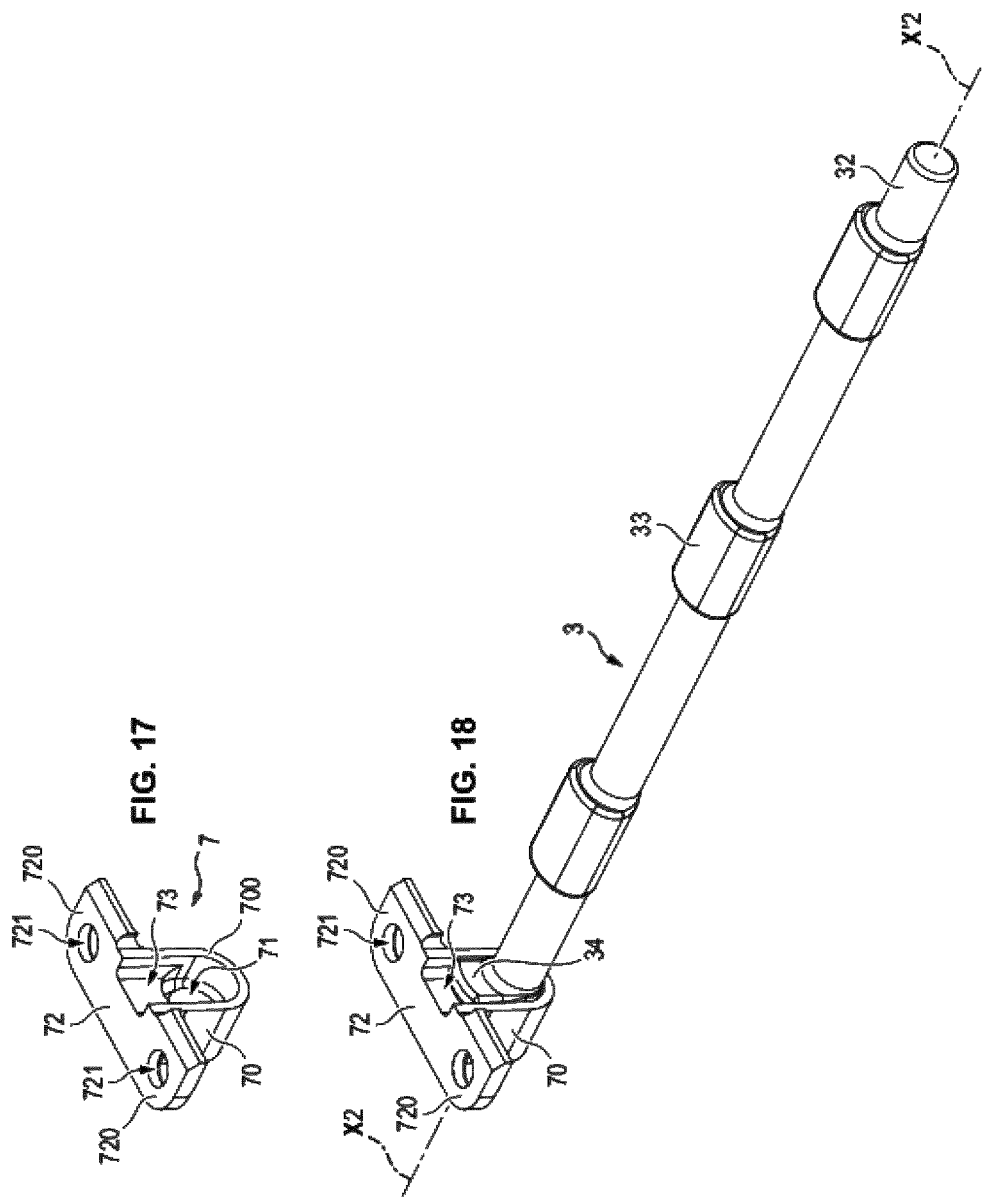
FIG. 17 is a perspective view of the rod lock.
FIG. 18 is a perspective view of the rod lock and of the prestressing rod retained by it.

Advantageously, the prestressing rod 3 can comprise a poka-yoke 34, preferably arranged in proximity to the upstream end 31 (see for example FIGS. 9 and 18). In FIG. 10, the section is such that the poka-yoke is not visible.

The poka-yoke 34 extends radially relative to the longitudinal axis X2-X'2 of the rod 3 and it is oriented so as to protrude on the same side of the rod 3 as the cams 33 do.

Thus, when the poka-yoke 34 extends downward in FIG. 9 (i.e. in the radially inward direction toward the center of the rotor disc 140), the rod 3 is in the position called the "rest" position, and when the poka-yoke extends upward in FIG. 18 (i.e. in the radially outward direction toward the outside of the rotor disk 140), the rod 3 is in the position called the "armed" position.

According to a variant embodiment shown schematically in FIG. 10, oblong holes 25 are provide in the central regions 22 of at least certain sections 20a, 20b, 20c, in order to further improve the flexibility and the deformability of the different portions of the wedge 2. These oblong holes 25 also allow lightening the wedge. They are positioned at the places which are not in contact with the cams 33 of the prestressing rod 3.

Figure 6:
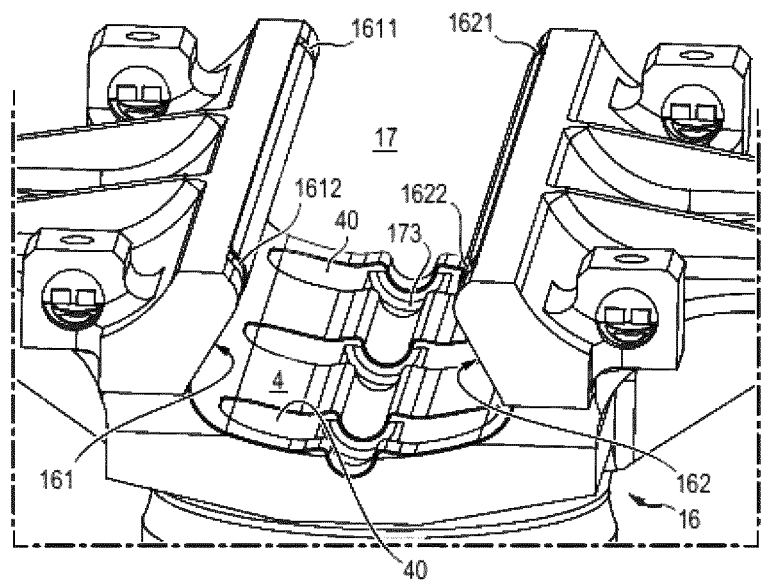
FIG. 6 is a perspective view of the cell of FIG. 5, provided with a setting foil.
Figure 7:
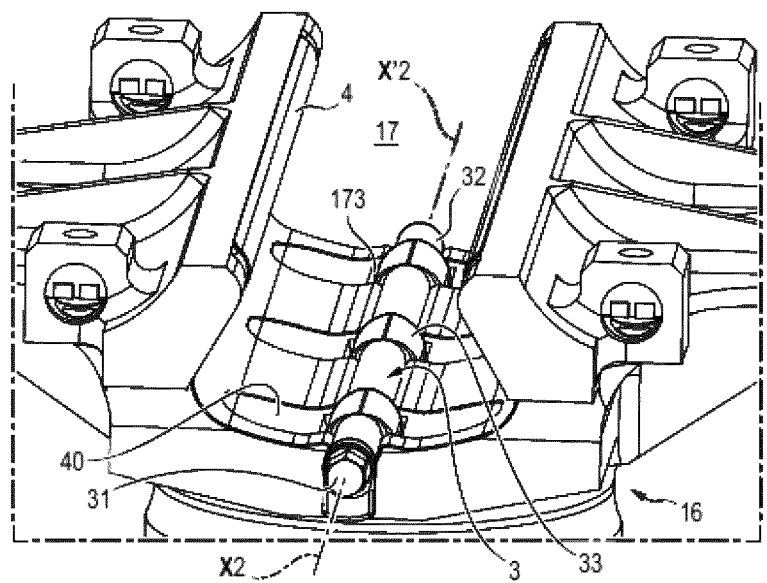
FIG. 7 is a perspective view of the cell of FIG. 5, provided with a setting foil and in which is arranged the prestressing rod, the latter being in the resting position.
Figure 8:
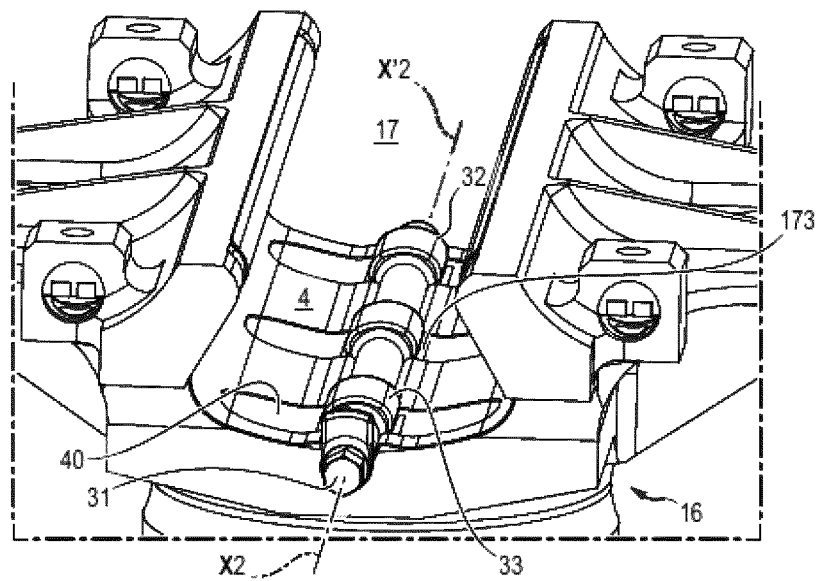
FIG. 8 is a view similar to FIG. 7, but in which the prestressing rod is in the armed position.

Advantageously, and as can be seen better in FIG. 6, a metal setting foil 4 is placed in the bottom of the cell 17, in order to protect it from friction with the rod 3. This setting foil 4 also extends to the bearing surfaces 161, 162 of the cell in order to protect the fastener 16 from friction with the blade root 150. The setting foil 4 is preferably perforated around the retraction cavities 173 which are not subject to friction (see the perforations labeled 40) and around the grooves 1611, 1621, 1612, 1622.

The setting foil 4 is preferably made of stainless steel and preferably has a thickness of a few tenths of a millimeter.

Other protective elements can also be present to protect the parts made of composite materials. Impregnated fabrics (or wearstrips) specially designed to resist friction, can for example be installed on the bearing surfaces of the blade root 150, in the regions in contact with the cell and on the wedge 2 in regions in contact with the cams 33 or the blade root 150.

Advantageously, and as can be seen in FIGS. 11 to 13, the shape of the transverse section of the base of the blade root 150 can have a central recess 154 (shaped like a bone head) in order to adapt itself optimally to the presence of the wedge 2 and the prestressing rod 3 with cams. This particular form allows clearing space for integrating the wedge and the rod below the blade root, while limiting the boring of the cell 17.

However, this is not the only function of this bone head shape, which also serves as an abutment for the cam 2, by cooperation of shapes, in the event of uncontrolled rolling-up of the blade (bird ingestion for example) as will be explained subsequently.

The axial retention of the blade root 150, of the wedge 2 and of the rod 3 are ensured by a downstream axial retention lock 5, an upstream axial retention lock 6 and the locking of the rod 3 in its armed position is ensured by a rod lock 7. These three locks are preferably made of metal.

Figure 15:
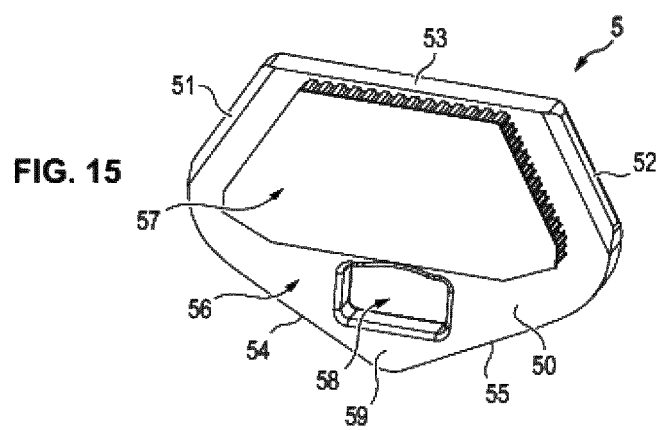
FIG. 15 is a perspective view of the downstream axial retention lock.

One exemplary embodiment of the downstream axial retention lock 5 is shown in FIG. 15.

This lock 5 comprises a plate 50 with a pentagonal shape with two lateral edges 51, 52, called "locking" edges, connected by a radially outer edge 53 and two radially inner edges 54, 55. The plate 50 has an inner face 56 on which is arranged a honeycomb damping part 57. Finally, the plate 50 is drilled with an orifice 58 arranged between the two edges 54, 55 lower than the honeycomb 57.

The plate 50 is dimensioned so that its two lateral edges 51, 52 can be inserted respectively into the downstream grooves 1611 and 1621 of the fastener 16, this in a radial direction from inside to outside, i.e. from bottom to top in FIGS. 5 to 8.

Figure 16A:
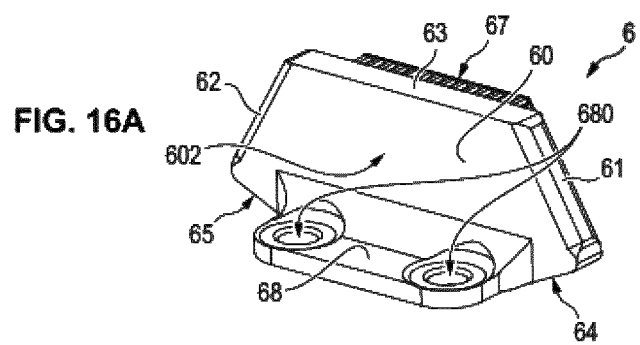
FIG. 16A is a perspective view of the upstream axial retention lock.
Figure 16B:
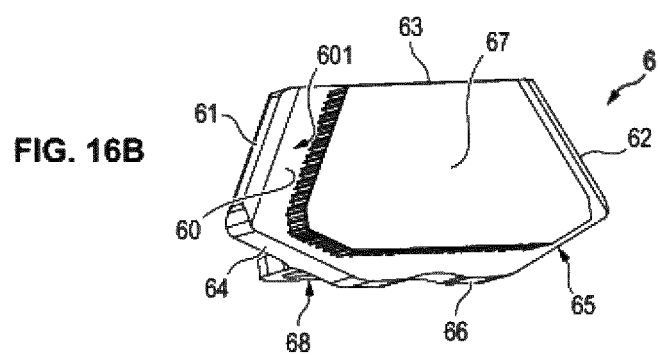
FIG. 16B is a perspective view of the upstream retention lock, taken along a viewing angle different from that of FIG. 16A.

The tip of the lock 5 arranged between its two edges 54, 55, below the orifice 58, is labeled 59. One exemplary embodiment of the upstream axial retention lock 6 is shown in FIGS. 16A and 16B. This lock 6 comprises a plate 60 with a hexagonal shape with two lateral edges 61, 62, called "locking" edges, connected by a radially outer edge 63, and two inner lateral edges 64, 65 inclined toward one another and connected by a radially inner edge 66, opposite to the edge 63. The plate 60 has an inner face 601, on which is arranged a honeycomb damping part 67 and an opposite outer face 602, which is continued outward by a perpendicular wing 68, drilled with at least one orifice 680, here with two.

The plate 60 is dimensioned so that its two lateral locking edges 61, 62 inclined in a V, can be inserted respectively into the upstream grooves 1612, 1622 of the fastener 16, this in a radial direction, from inside to outside, i.e. from bottom to top in FIGS. 5 to 8. In this position, the honeycomb 67 is in abutment against the blade root 150 and the lock 6 blocks this root axially.

The rod lock 7 will now be described in connection with FIGS. 17 and 18. This lock 7 has the general shape of a jumper. It comprises a U shaped portion 70 delimiting a through opening 71 in the lower portion of the U. This U shaped portion is blocked at its upper portion by a plate 72 which extends beyond the U on either side so as to provide two wings 720. Each wing 720 is drilled with an orifice 721.

Figure 14:
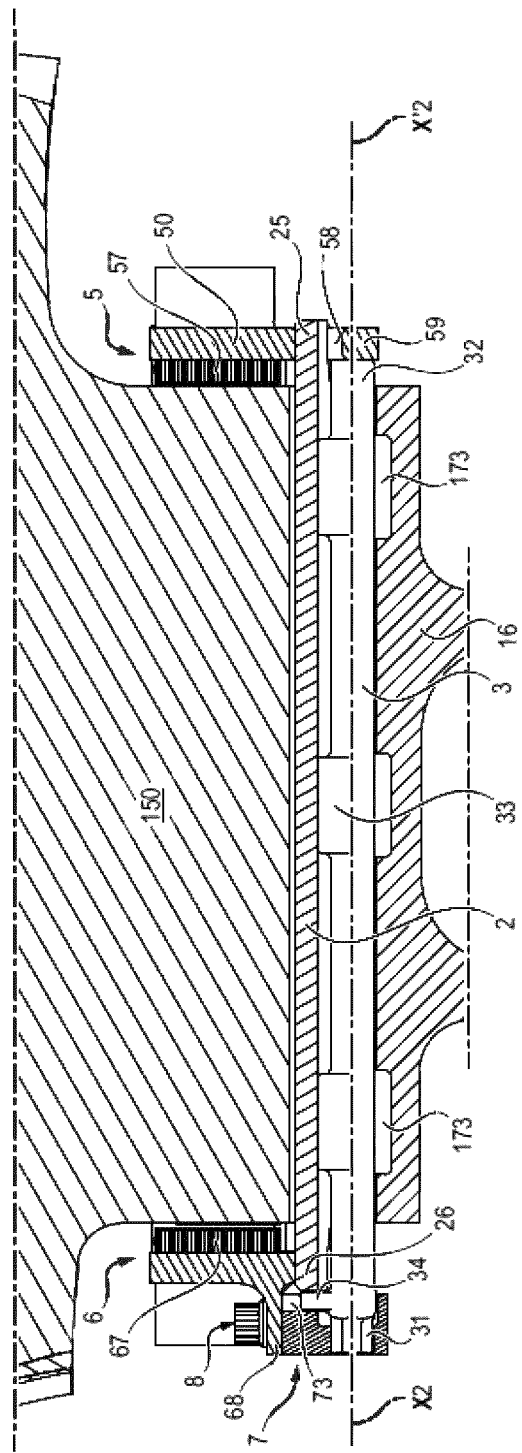
FIG. 14 is a longitudinal section view of the prestressing rod, of the wedge, of a portion of the blade root and of the cell, of the upstream and downstream retention locks and of the rod lock taken along a section plane passing through the axis X2-X'2 of the rod 3.

A notch 73 is provided in the central portion of the plate 72, at its junction with the inner face 700 of the U shaped portion 70, i.e. the face intended to be turned toward the cell 17 when the rod lock 7 is in place (see FIG. 14).

Figure 20:
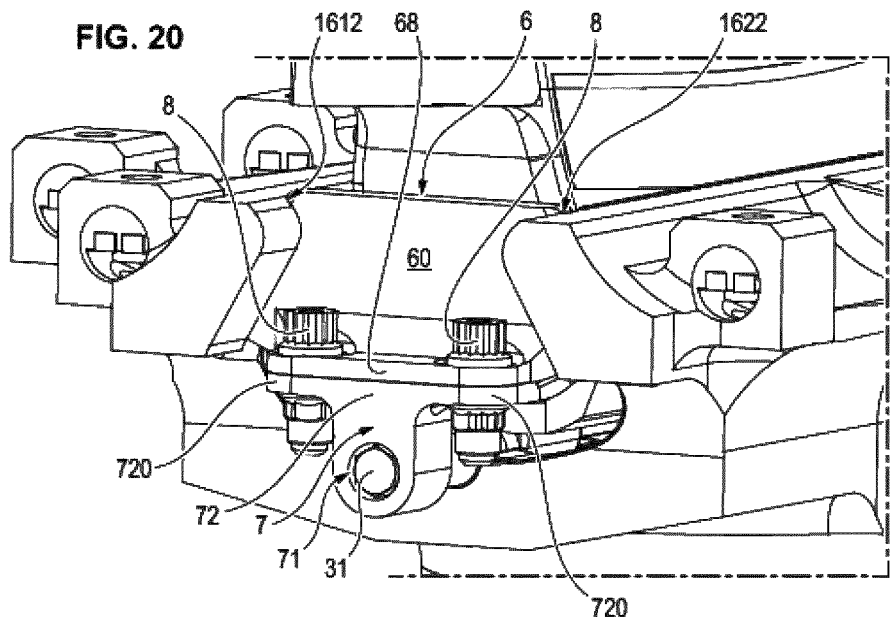
FIG. 20 is a perspective view of the upstream end of the blade fastener, of the prestressing rod, of the upstream retention lock and of the rod lock, the latter two being assembled.

In FIGS. 14 and 20, it can be seen that the opening 71 is configured to receive the upstream end 31 of the rod 3 so that the periphery of this end (and for example its cut-aways) are no longer accessible and cannot be manipulated in rotation.

In FIGS. 14 and 18, it can be seen that the notch 73 is configured to receive the radial poka-yoke 34 when the prestressing rod 3 is in the armed position, i.e. when the cams 33 press against the wedge 2.

The rod lock 7 can be assembled with the upstream retention lock 6 by applying the plate 72 against the wing 68, by aligning the orifices 721 with the orifices 680 and by inserting assembly members 8, such as screws and nuts, into these orifices (see FIG. 20).

The assembly sequence of the blade root 150 into the cell 17 of the fastener 16 follows in succession the following steps:

Installing the metal setting foil 4 in the bottom 171 of the cell 17 of the pivoting fastener 16, Installing the prestressing rod 3 in the bottom of the cell 17 in its rest position, with the cams 33 housed in the retraction cavities 173 (see FIG. 7), Installing the downstream retention lock 5 in the downstream guide slots 1611, 1621, the end 32 of the rod 3 coming into abutment against the tip 59 of the lock 5 (see FIG. 10), Inserting the blade root 150 inside the cell 17 of the fastener 16 by sliding until it is in abutment on the honeycomb 57 of the downstream retention lock 5, Installing the upstream retention lock 6 in the upstream guide slots 1612, 1622, the honeycomb 67 coming into abutment against the blade root 150, Introducing the wedge 2 between the blade root 150 and the prestressing rod 3, the downstream end 25 of the wedge 2 penetrating into the orifice 58 of the downstream retention lock 5 (see FIG. 14). The situation shown in FIG. 11 is then present. The assembly of the wedge 2 then occurs without effort because a clearance J (see FIG. 11) exists between the face of the rod 3 not having a cam 33 and the bottom of the recess 154 of the blade root 150 and the wedge 2 is rectilinear along its longitudinal axis X1-X'1.

Applying a torque (arrow G, FIG. 12) to the upstream end 31 of the prestressing rod 3 with a tool to accomplish a rotation of 180° and thus engaging the cams 33 in the hollows 220 of the central region 22 of the wedge 2. During this rotation, the geometry of the cams 33 generates a hard point felt by the operator, during which the wedge 2 is slightly overstressed (see FIG. 12), without ever entering into contact with the central recess 154 of the blade root 150. There exists a clearance J1 between the bottom of the recess 154 and the domed portion 221 (see FIG. 12) which is suited to allowing this transitory deformation of the wedge 2. Once this hard point is passed, the continuation of the rotation brings the rod 3 into a new equilibrium position (the armed position) shown in FIG. 13. The value of the clearance J1 varies depending on the orientation of the cam 33. The geometry of the cams 33 is symmetrical, and has a hard point on either side of this armed equilibrium position, preventing the system from being able to disarm itself, in one direction or in the other, without the force supplied by the operator. In the position of FIG. 13, the cams 33 are supported on the wedge 2 and induce its deformation. By way of comparison, in FIGS. 12 and 13, the dotted line arranged under the cam 2 shows its shape when it is not armed.

Installing the rod lock 7 and bolting on the upstream retention lock by means of bolts 8 (see FIGS. 14 and 20).

Figure 19:
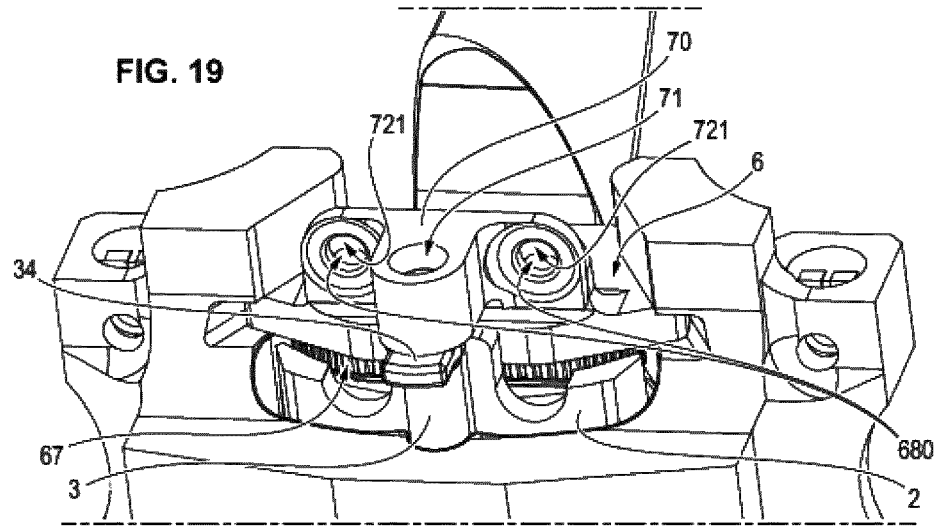
FIG. 19 is a perspective view of the upstream end of the blade fastener, of the prestressing rod, of the upstream retention lock and of the rod lock, the latter two not being assembled.

Another advantage of the rod lock 7 resides in the fact that the notch 73 and the U shaped portion 70 surrounding the poka-yoke of the prestressing rod, preventing its assembly if the prestressing rod 3 is not armed. As can be seen in FIG. 19, when the poka-yoke 34 is oriented downward (rod 3 at rest), the U shaped portion 70 abuts against it, the orifices 721 not being able to be aligned with the orifices 680 and assembly being impossible. This allows preventing the assembly of the blade without preload of the root 150.

When all the parts are assembled and armed:

the downstream retention lock 5 serves as a downstream abutment of the prestressing rod 3 and of the wedge 2, the wedge 2, armed by the prestressing rod 3, pushes the upstream 6 and downstream 5 retention locks into their respective V grooves of the fastener 16, the poka-yoke 34 of the prestressing rod 3 serves as an upstream abutment for the wedge 2, the rod lock 7 serves as an upstream abutment for the prestressing rod 3, locks the arming of the rod 3 and prevents access to the control for rotating the prestressing rod 3.

The disassembly of the blade is easily carried out by performing these steps in the reverse order.

When the system is armed, the function of the rod with cams 3 is to impose a radial outward movement on the center 22 of the wedge 2 the ends 23, 24 of which are supported by the blade root 150. The wedge 2 then behaves as a spring because the resulting radial force depends on its structural stiffness. By analogy, the wedge 2 can also be seen, in its transverse section, as a beam in three-point bending. The central force exerted by the cams 33 on the wedge 2 is equal to the sum of the forces exerted by the ends 23, 24 of the wedge on the blade root 150. The force transmitted to the blade root depends on the bending in the center of the wedge 2, i.e., the radial outward movement, imposed by the cam 33 when the system is armed. Using the same analogy, the internal stresses in the wedge 2 are considered to be a maximum in its center and at the surface. Consequently, an advantage of this system is the possibility of adjusting the preload force on the blade root 150 by acting either on the geometry of the cam 33, the geometry of the wedge 2 or the material of the wedge 2.

However, the wedge 2 must resist internal pressures due to its bending. It is therefore preferable that it have a minimum thickness, in particular at its center, but also without being too stiff. Thus, advantageously and to satisfy this compromise, the thickness of the wedge 2 decreases from the center (thickness E1 in FIG. 13) to the ends (thickness E2), with E1 greater than E2.

Then it is important not to lose the assembly preload due to the centrifugal force which will move the blade root radially outward (upward in FIGS. 11 to 13) and consequently relax the deformation level of the wedge 2. This implies that the radially outward movement imposed by the cams 33 is large compared to the radially outward movement of the blade root 150 in the starting regime. To achieve the targeted preload force, it is therefore preferable to reduce the stiffness of the wedge 2, for example by reducing its stiffness E1, and increasing the movement imposed by the cams 33 by increasing their dimensions.

Figure 21:
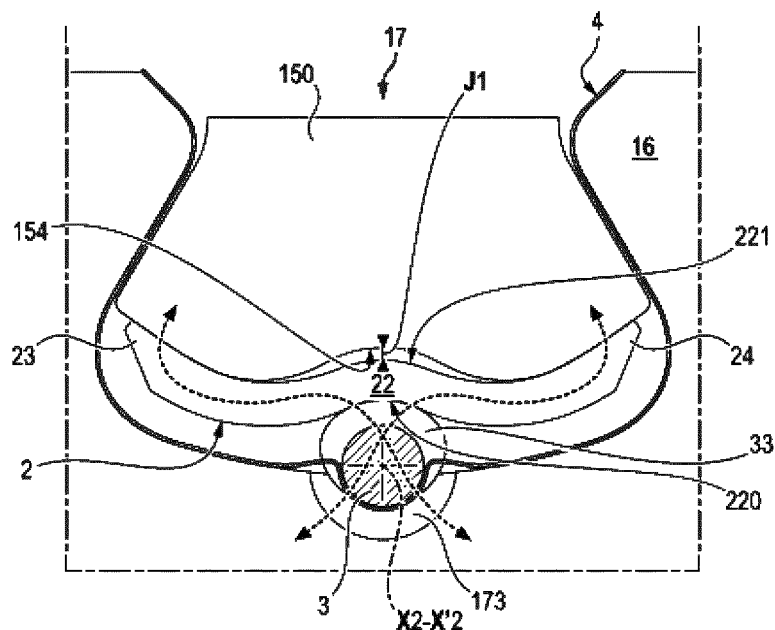
FIG. 21 is a view similar to FIG. 13 showing the load paths in the case of normal operation of the rotor.

In FIG. 21, the dotted arrows show the force paths when the prestressing rod 3 is in the armed position and the rotor is in normal operation. The forces transit from the center 22 of the wedge 2 to its ends 23, 24 in contact with the blade root. The functional clearance J1 between the domed portion 221 of the wedge 22 and the recess 154 of the blade root 150 allows the wedge 2 to play its role as a spring. This allows retaining the preload when the blade 15 moves under the influence of a centrifugal force.

Figure 22:
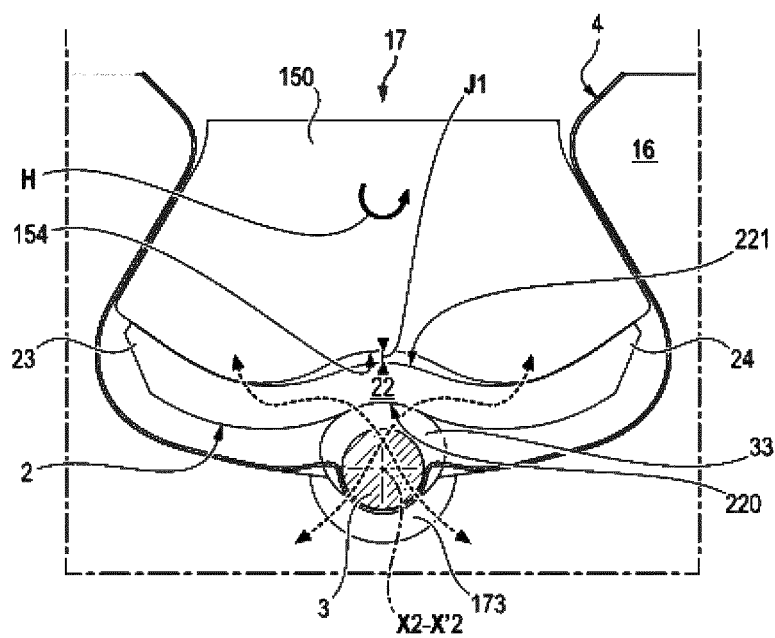
FIG. 22 is a view similar to FIG. 13 showing the load paths in the case where the blade root is subjected to roll.

FIG. 22 shows the situation when the prestressing rod 3 is armed but the preload becomes insufficient to counteract the roll-up of the blade root 150, due to too great an aerodynamic force or a bird ingestion into the rotor blades for example. In this case, not only does the blade root 150 roll up (arrow H) but it descends into the cell 17. The surfaces in contact between the wedge 2 and the blade root 150 approach the surfaces in contact between the wedge 2 and the cams 33. The force paths (dotted lines) shorten and it is the compression of the wedge 2 in its thickness that directly opposes the rolling-up of the blade. The wedge 2 acts as an abutment. The value of the clearance J1 decreases.

Finally, it will be noted that the different sections 20a, 20b, 20c of the wedge 2 react separately to the movement of the blade 15, which allows accompanying as well as possible the movement of each of the portions of the blade root 150.

It should be noted that the clearance J1, present between the recess 154 of the blade root 150 and the domed portion 221 of the central region 22 of the wedge 2 arranged facing it, is greater in the resting position of the rod 3 than when the rod is in the armed position.

In the preceding description, the blades 15 are made of a 3D-woven composite material on the general principle of known blades made of composite having a woven preform impregnated with a resin, the root of which is however adapted to conform to the provisions for the root described in the corresponding passage of the preceding description.

The invention claimed is:

1. A fan rotor provided with variable pitch blades, this rotor comprising a rotor disc provided at the periphery of the rotor disc with a plurality of fasteners, each fastener being rotatably mounted relative to said rotor disc around a radial pitch axis and each fastener comprising a cell for receiving a blade root of one of said variable pitch blades, an elongated wedge being arranged in each cell, wherein a central portion of the blade root has a recess, wherein the blade root is arranged in the cell so that the recess of the blade root is oriented toward a bottom of the cell, wherein a prestressing rod with at least one cam is also arranged in each cell, wherein the wedge is made of an elastically deformable material, wherein the wedge has at least one longitudinal section which has a transverse profile in the form of an arc, a central region of which is curved, so that it comprises a domed portion protruding in a direction of a concavity of said arc and a hollow in a direction of a convexity of the arc, wherein the wedge is arranged in the cell so that the domed portion of the wedge faces the recess of the blade root and that the hollow of the wedge is oriented toward the bottom of the cell, wherein the bottom of said cell comprises at least one retraction cavity, there being as many retraction cavities as the rod has cams, wherein the prestressing rod is interposed between the hollow of the central region of the wedge and the bottom of the cell, so that the at least one cam faces the at least one retraction cavity, and wherein the prestressing rod is movable in rotation around the longitudinal axis of the prestressing rod, so as to be able to be moved between a resting position, in which the at least one cam is housed in the at least one retraction cavity, and an armed position, in which the at least one cam exerts a radial pressure on the central region of the wedge so as to move the wedge in the direction of the blade root and so that two lateral regions of the wedge, arranged on either side of the central region of the wedge, are in contact with corresponding lateral regions of the blade root and are remote from the bottom of the cell.

2. The fan rotor according to claim 1, wherein there exists a functional clearance between the recess of the blade root and the domed portion of the central region of the wedge arranged facing, the clearance being greater in the resting position of the prestressing rod than when the prestressing rod is in the armed position.

3. The fan rotor according to claim 1, wherein the bottom of the cell is provided with a longitudinal groove intended to receive and to guide the prestressing rod and wherein the at least one retraction cavity is provided in the groove.

4. The fan rotor according to claim 1, wherein the wedge has a greater thickness in the central region of the wedge than the thickness_of the ends of the wedge.

5. The fan rotor according to claim 1, wherein the wedge consists of several sections connected by narrower junctions.

6. The fan rotor according to claim 1, wherein a setting foil is arranged at the bottom of the cell of the fastener.

7. The fan rotor according to claim 1, wherein one of the ends of the prestressing rod has a shape which allows the gripping and the driving of the prestressing rod in rotation around the longitudinal axis of the prestressing rod by a tool.

8. The fan rotor according to claim 1, wherein the prestressing rod has, in proximity to one of the ends of the prestressing rod, a poka-yoke which extends radially relative to the longitudinal axis of said rod and which protrudes from the same side of the rod as the at least one cam protrudes.

9. The fan rotor according to claim 8, wherein the cell is provided with flanks, wherein the flanks of the cell comprise an upstream end provided with two upstream slots, wherein an upstream axial retention lock of the blade root, formed from a plate, is inserted into the two upstream slots provided at the upstream end of the flanks of said cell for receiving the blade root, these two upstream slots being arranged in a V, and wherein a rod lock is fastened to said upstream axial retention lock, this rod lock being provided with an opening for receiving one of the ends of the prestressing rod, and with a notch for receiving the poka-yoke of said rod so as to block said prestressing rod in the armed position.

10. The fan blade according to claim 9, wherein the prestressing rod has an upstream end and wherein the opening provided in the rod lock receives the upstream end of the prestressing rod.

11. The fan rotor according to claim 1, wherein the cell is provided with flanks, wherein the flanks of the cell comprise an downstream end provided with two downstream slots, wherein a downstream axial retention lock of the blade root, formed from a plate, is inserted into the two downstream slots provided at the downstream end of the flanks of said cell for receiving the blade root, these two downstream slots being arranged in a V, wherein the downstream lock is drilled with an orifice for receiving a downstream end of said wedge and wherein the downstream retention lock has, on the inner face of the downstream retention lock, a surface forming an axial abutment for a downstream end of said stressing rod.

12. The fan rotor according to claim 1, wherein the wedge is made of a 3D-woven composite material.

13. The fan rotor according to claim 1, wherein the variable pitch blades are made of a 3D-woven composite material.

14. A turbomachine, wherein the turbomachine includes a fan rotor provided with variable pitch blades according to claim 1.

15. The fan blade according to claim 1, wherein the prestressing rod has an upstream end and wherein the upstream end has a shape which allows the gripping and the driving of the prestressing rod in rotation around the longitudinal axis of the prestressing rod by a tool.

16. The fan blade according to claim 1, wherein the prestressing rod has an upstream end and wherein the prestressing rod has, in proximity to the upstream end of the prestressing rod, a poka-yoke which extends radially relative to the longitudinal axis of said rod and which protrudes from the same side of the rod as the at least one cam protrudes.

* * * * *